(12) United States Patent
Sasaki et al.

(10) Patent No.: US 7,224,553 B2
(45) Date of Patent: May 29, 2007

(54) THIN-FILM MAGNETIC HEAD, HEAD GIMBAL ASSEMBLY, AND HARD DISK DRIVE INCORPORATING A HEATER

(75) Inventors: Tetsuro Sasaki, Tokyo (JP); Nubuya Oyama, Tokyo (JP); Eiichi Omata, Tokyo (JP); Masashi Sano, Tokyo (JP); Soji Koide, Tokyo (JP)

(73) Assignee: TDK Corporation, Tokyo (JP)

( * ) Notice: Subject to any disclaimer, the term of this patent is extended or adjusted under 35 U.S.C. 154(b) by 458 days.

(21) Appl. No.: 10/865,862

(22) Filed: Jun. 14, 2004

(65) Prior Publication Data

US 2005/0030666 A1  Feb. 10, 2005

(30) Foreign Application Priority Data

Aug. 5, 2003   (JP)   ............................. P2003-287134

(51) Int. Cl.
*G11B 5/187*   (2006.01)
*G11B 5/33*   (2006.01)

(52) U.S. Cl. ........................................ 360/128; 360/126
(58) Field of Classification Search ................. 360/128
See application file for complete search history.

(56) References Cited

U.S. PATENT DOCUMENTS 6,493,183 B1 * 12/2002 Kasiraj et al. .............. 360/126
6,956,716 B2 * 10/2005 Lille .......................... 360/126
7,023,660 B2 *  4/2006 Hsiao et al. ................ 360/128
7,068,468 B2 *  6/2006 Kamijima ................... 360/128
7,155,808 B2 *  1/2007 Sasaki et al. ............ 29/603.07
7,164,555 B2 *  1/2007 Kato et al. .................. 360/128
2005/0094319 A1 *  5/2005 Han et al. ................... 360/319
2006/0291098 A1 * 12/2006 Ota et al. ................... 360/128
2007/0019325 A1 *  1/2007 Shimizu et al. ............. 360/126

FOREIGN PATENT DOCUMENTS

| JP | A 59-105287 | 6/1984 |
| JP | A 60-182352 | 9/1985 |
| JP | A 5-20635 | 1/1993 |
| JP | A 05-020635 | 1/1993 |
| JP | A 2003-168274 | 6/2003 |
| WO | WO 02/13220 A1 * | 2/2002 |

* cited by examiner

Primary Examiner—Jefferson Evans
(74) Attorney, Agent, or Firm—Oliff & Berridge, PLC

(57) ABSTRACT

A thin-film magnetic head comprises at least one of an electromagnetic transducer and a magnetoresistive device, and a heater member adapted to generate heat upon energization. The heater member contains NiCu or NiCr.

7 Claims, 14 Drawing Sheets

Fig.12

| | HEATING PART MATERIAL | COIL RESISTANCE [Ω] | | RESISTANCE CHANGE RATIO [%] |
|---|---|---|---|---|
| | | POWER 0.1mW | POWER 100mW | |
| COMPARATIVE EXAMPLE 1 | Ni80Fe20 | 99.2 | 124.7 | 25.7 |
| COMPARATIVE EXAMPLE 2 | Cu | 100.3 | 132.3 | 31.9 |
| COMPARATIVE EXAMPLE 3 | W | 101.1 | 137.0 | 35.5 |
| COMPARATIVE EXAMPLE 4 | Ta | 101.8 | 129.2 | 26.9 |
| COMPARATIVE EXAMPLE 5 | Cr | 100.6 | 120.3 | 19.6 |
| COMPARATIVE EXAMPLE 6 | Al | 100.5 | 130.9 | 30.2 |
| COMPARATIVE EXAMPLE 7 | Co | 100.7 | 149.9 | 48.9 |
| COMPARATIVE EXAMPLE 8 | Co90Fe10 | 99.1 | 132.5 | 33.7 |
| EXAMPLE 1 | Ni60Cu40 | 100.2 | 97.3 | −2.9 |
| EXAMPLE 2 | Ni55Cu45 | 101.8 | 99.9 | −1.9 |
| EXAMPLE 3 | Ni50Cu50 | 101.8 | 101.0 | −0.8 |
| EXAMPLE 4 | Ni45Cu55 | 101.0 | 101.2 | 0.2 |
| EXAMPLE 5 | Ni40Cu60 | 99.0 | 99.8 | 0.8 |
| EXAMPLE 6 | Ni25Cu75 | 101.1 | 103.0 | 1.9 |
| EXAMPLE 7 | Ni15Cu85 | 102.0 | 104.9 | 2.8 |
| EXAMPLE 8 | Ni90Cr10 | 99.4 | 102.2 | 2.8 |
| EXAMPLE 9 | Ni85Cr15 | 102.6 | 104.4 | 1.8 |
| EXAMPLE 10 | Ni80Cr20 | 101.8 | 102.2 | 0.4 |
| EXAMPLE 11 | Ni70Cr30 | 100.4 | 102.2 | 1.8 |
| EXAMPLE 12 | Ni55Cr45 | 99.7 | 102.6 | 2.9 |

Fig.13

| | ADDED MATERIAL | CONTENT [ATOM%] | COIL RESISTANCE[Ω] | | RESISTANCE CHANGE RATIO [%] |
|---|---|---|---|---|---|
| | | | POWER 0.1mW | POWER 100mW | |
| EXAMPLE13 | Ta | 2 | 99.8 | 101.0 | 1.2 |
| EXAMPLE14 | Al | 5 | 100.1 | 101.1 | 1.0 |
| EXAMPLE15 | Mn | 2 | 99.2 | 100.5 | 1.3 |
| EXAMPLE16 | Cr | 5 | 99.8 | 101.7 | 1.9 |
| EXAMPLE17 | Fe | 1 | 100.7 | 101.9 | 1.2 |
| EXAMPLE18 | Mo | 3 | 102.7 | 104.7 | 1.9 |
| EXAMPLE19 | Co | 3 | 101.6 | 103.2 | 1.6 |
| EXAMPLE20 | Rh | 1 | 104.3 | 106.1 | 1.7 |
| EXAMPLE21 | Si | 2 | 102.3 | 103.4 | 1.1 |
| EXAMPLE22 | Ir | 1 | 101.2 | 102.5 | 1.3 |
| EXAMPLE23 | Pt | 1 | 99.6 | 100.9 | 1.3 |
| EXAMPLE24 | Ti | 2 | 100.3 | 101.7 | 1.4 |
| EXAMPLE25 | Nb | 1 | 102.8 | 104.7 | 1.8 |
| EXAMPLE26 | Zr | 1 | 102.9 | 104.9 | 1.9 |
| EXAMPLE27 | Hf | 1 | 100.5 | 101.9 | 1.4 |

*Fig.14*

| | ADDED MATERIAL | CONTENT [ATOM%] | COIL RESISTANCE[Ω] | | RESISTANCE CHANGE RATIO [%] |
|---|---|---|---|---|---|
| | | | POWER 0.1mW | POWER 100mW | |
| EXAMPLE28 | Ta | 2 | 98.9 | 100.4 | 1.5 |
| EXAMPLE29 | Al | 5 | 100.9 | 101.4 | 0.5 |
| EXAMPLE30 | Mn | 2 | 98.4 | 99.5 | 1.1 |
| EXAMPLE31 | Cu | 5 | 100.1 | 102.0 | 1.9 |
| EXAMPLE32 | Fe | 1 | 101.4 | 103.1 | 1.7 |
| EXAMPLE33 | Mo | 3 | 103.5 | 105.3 | 1.7 |
| EXAMPLE34 | Co | 3 | 102.0 | 103.9 | 1.9 |
| EXAMPLE35 | Rh | 1 | 105.1 | 107.1 | 1.9 |
| EXAMPLE36 | Si | 2 | 102.2 | 103.0 | 0.8 |
| EXAMPLE37 | Ir | 1 | 102.2 | 104.1 | 1.9 |
| EXAMPLE38 | Pt | 1 | 99.0 | 100.9 | 1.9 |
| EXAMPLE39 | Ti | 2 | 99.9 | 101.2 | 1.3 |
| EXAMPLE40 | Nb | 1 | 103.5 | 105.1 | 1.5 |
| EXAMPLE41 | Zr | 1 | 102.1 | 103.5 | 1.4 |
| EXAMPLE42 | Hf | 1 | 101.3 | 103.2 | 1.9 |

THIN-FILM MAGNETIC HEAD, HEAD GIMBAL ASSEMBLY, AND HARD DISK DRIVE INCORPORATING A HEATER

BACKGROUND OF THE INVENTION

1. Field of the Invention

The present invention relates to a thin-film magnetic head, a head gimbal assembly, and a hard disk drive.

2. Related Background Art

A thin-film magnetic head provided with an electromagnetic transducer for writing and a magnetoresistive device for reproducing is configured so as to float up from a hard disk, which is a recording medium, at the time of recording/reproducing with respect to a hard disk drive. Specifically, the thin-film magnetic head is mounted to a gimbal, which is attached to a leading end part of a flexible suspension arm, so as to construct a head gimbal assembly (HGA). As an airflow accompanying the rotation of the hard disk runs under the thin-film magnetic head, the suspension arm flexes, whereby the head floats up.

As hard disks have been achieving a higher density, the gap between the thin-film magnetic head and a hard disk, i.e., the head flying height, has been decreasing from 20 nm to 15 nm, and further to 10 nm, thereby approaching its limit.

SUMMARY OF THE INVENTION

For a further higher density, it has been demanded that the distance between the electromagnetic transducer or magnetoresistive device of the thin-film magnetic head and the recording medium be shorter than that conventionally available.

For fulfilling the above-mentioned demand, it is an object of the present invention to provide a thin-film magnetic head, a head gimbal assembly, and a hard disk drive which can further shorten the gap between the electromagnetic transducer or magnetoresistive device of the thin-film magnetic head and the recording medium.

As a result of diligent studies, the inventors have found the following. A thin-film magnetic head is provided with a heater member adapted to generate heat upon energization, and the heater member is heated, so that the thin-film magnetic head thermally expands. The thermal expansion of the thin-film magnetic head can reduce the distance between the magnetoresistive device or electromagnetic transducer and its opposing recording medium.

The inventors have further found the following fact. When energizing the heater member, the electric resistivity of the heater member itself changes (increases) as the temperature of the heater member rises, thereby making it harder to adjust the heating state of the heater member to a desirable state. As a result, it may become impossible to control the distance between the magnetoresistive device or electromagnetic transducer and its opposing recording medium so as keep a desirable value.

In one aspect, the present invention provides a thin-film magnetic head comprising at least one of an electromagnetic transducer and a magnetoresistive device, and a heater member adapted to generate heat upon energization, wherein the heater member contains NiCu.

In the thin-film magnetic head in accordance with this aspect of the present invention, the heater member generates heat when energized, so that the thin-film magnetic head thermally expands, whereby the distance between the magnetoresistive device or electromagnetic transducer of the thin-film magnetic head and the recording medium is reduced.

Since the heater member contains NiCu as a material, the change in electric resistivity due to the temperature rise in the heater member at the time of energization is suppressed. This can make it relatively easy for the heater member to keep a desirable heating state. As a result, the distance between the magnetoresistive device or electromagnetic transducer of the thin-film magnetic head and the recording medium can be controlled so as to keep a desirable value.

Preferably, the Ni atom content in NiCu is 25 to 45 atom %. This can further suppress the change in electric resistivity of the heater member.

In another aspect, the present invention provides a thin-film magnetic head comprising at least one of an electromagnetic transducer and a magnetoresistive device, and a heater member adapted to generate heat upon energization, wherein the heater member contains NiCr.

In the thin-film magnetic head in accordance with this aspect of the present invention, the heater member generates heat when energized, so that the thin-film magnetic head thermally expands, whereby the distance between the magnetoresistive device or electromagnetic transducer of the thin-film magnetic head and the recording medium is reduced.

Since the heater member contains NiCr as a material, the change in electric resistivity due to the temperature rise in the heater member at the time of energization is suppressed. This can make it relatively easy for the heater member to keep a desirable heating state. As a result, the distance between the magnetoresistive device or electromagnetic transducer of the thin-film magnetic head and the recording medium can be controlled so as to keep a desirable value.

Preferably, the Ni atom content in NiCr is 70 to 85 atom %. This can further suppress the change in electric resistivity of the heater member.

In still another aspect, the present invention provides a head gimbal assembly comprising a support, a thin-film magnetic head formed on the support, and a gimbal for securing the support; wherein the thin-film magnetic head comprises at least one of an electromagnetic transducer and a magnetoresistive device, and a heater member adapted to generate heat upon energization, wherein the heater member contains NiCu or NiCr.

In still another aspect, the present invention provides a hard disk drive comprising a support, a thin-film magnetic head formed on the support, and a recording medium opposing the thin-film magnetic head; wherein the thin-film magnetic head comprises at least one of an electromagnetic transducer and a magnetoresistive device, and a heater member adapted to generate heat upon energization, wherein the heater member contains NiCu or NiCr.

Such a head gimbal assembly or hard disk drive comprises the above-mentioned thin-film magnetic head, and thus can similarly shorten the distance between the magnetoresistive device or electromagnetic transducer of the thin-film magnetic head and the recording medium, and reduce fluctuations in the ohmic value of the heater. Also, the change in electric resistivity due to the temperature rise in the heater member at the time of energization is suppressed, whereby the distance between the magnetoresistive device or electromagnetic transducer of the thin-film magnetic head and the recording medium can be controlled so as to keep a desirable value.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 12 is a chart showing Comparative Examples 1 to 8 and Examples 1 to 12;

FIG. 13 is a chart showing Examples 13 to 27; and

FIG. 14 is a chart showing Examples 28 to 42.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions.

Figure 1:
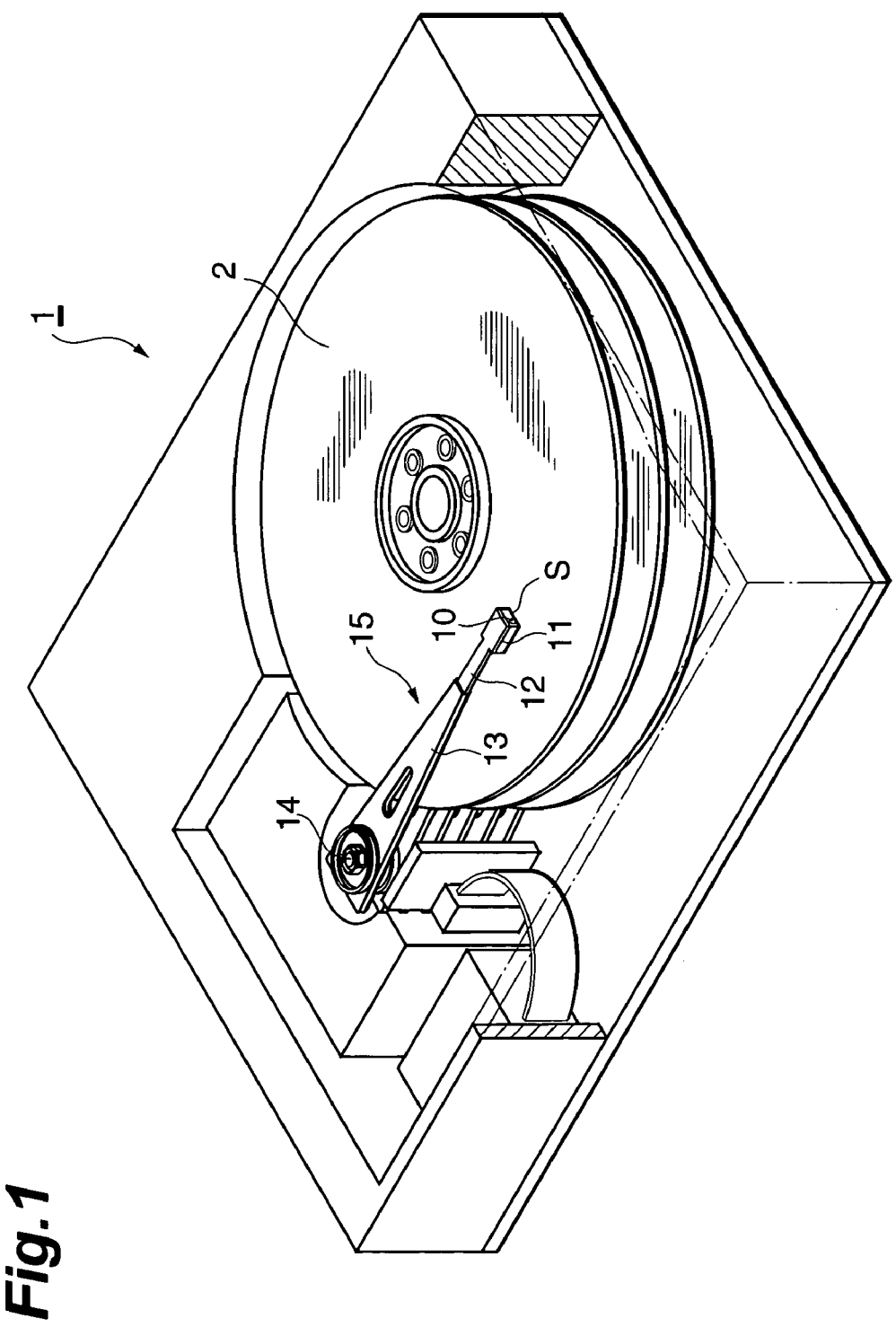
FIG. 1 is a perspective view showing the hard disk drive in accordance with an embodiment of the present invention.

FIG. 1 is a view showing a hard disk drive equipped with the thin-film magnetic head in accordance with an embodiment of the present invention. The hard disk drive 1 is one which actuates a head gimbal assembly (HGA) 15, so that a thin-film magnetic head 10 records/reproduces magnetic information onto/from a recording surface (the upper face in FIG. 1) of a hard disk (recording medium) 2 rotating at a high speed. The head gimbal assembly 15 comprises a gimbal 12 mounted with a head slider 11 formed with the thin-film magnetic head 10, and a suspension arm 13 to which the gimbal 12 is connected. The head gimbal assembly 15 is rotatable about a shaft 14 by a voice coil motor, for example. When the head gimbal assembly 15 is rotated, the head slider 11 moves radially of the hard disk 2, i.e., in directions traversing track lines.

Figure 2:
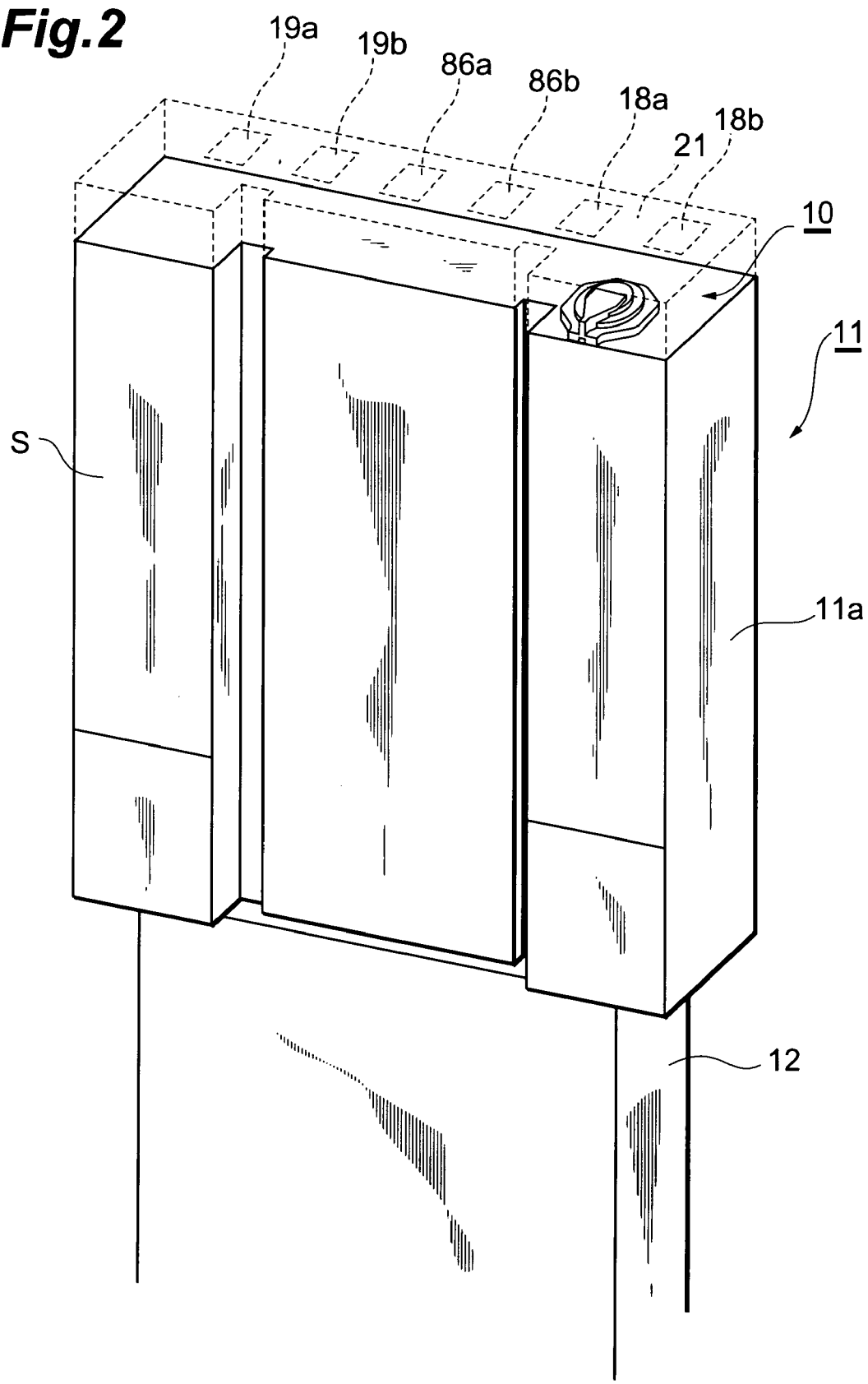
FIG. 2 is a perspective view showing a head slider.

FIG. 2 is an enlarged perspective view of the head slider 11. The head slider 11 has a substantially rectangular parallelepiped form. The thin-film magnetic head 10 is formed on a support 11a mainly composed of AlTiC ($Al_2O_3.TiC$). The front side in this drawing is a recording medium opposing surface facing the recording surface of the hard disk 2, and is referred to as an air bearing surface (ABS) S. When the hard disk 2 rotates, an airflow accompanying the rotation causes the heard slider 11 to levitate, whereby the air bearing surface S separates from the recording surface of the hard disk 2. An overcoat layer 21 (which will be explained later in detail) indicated by broken lines in the drawing is provided on the thin-film magnetic head 10 in order to protect the thin-film magnetic head 10. Recording pads 18a, 18b, reproducing pads 19a, 19b, and heater pads 86a, 86b, which will be explained later, are attached onto the overcoat layer 21. Leads (not depicted), connected to the respective pads, for inputting/outputting electric signals are attached to the suspension arm 13 shown in FIG. 1. The air bearing surface S may be coated with DLC (Diamond Like Carbon) and the like.

Figure 3:
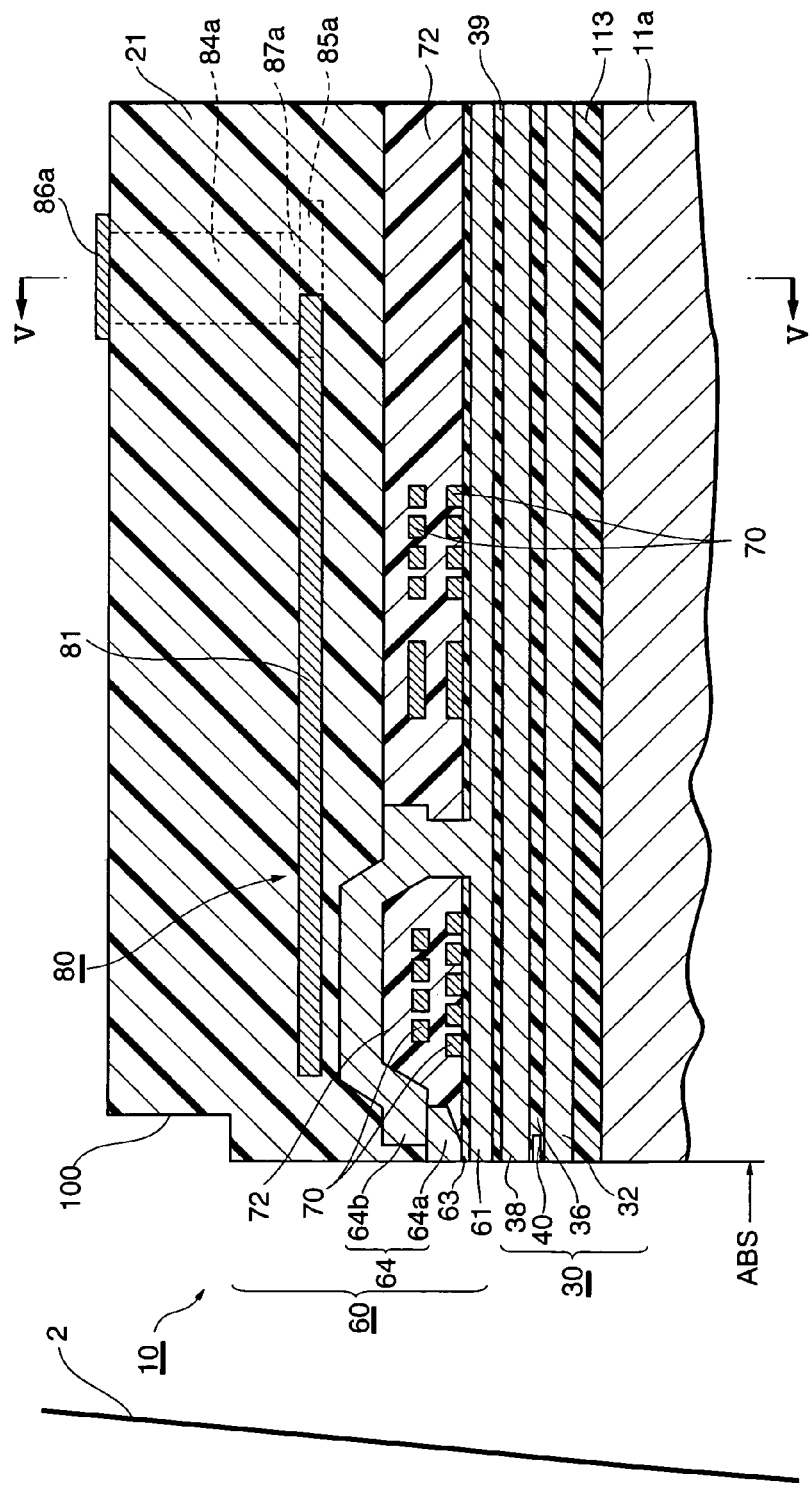
FIG. 3 is a sectional view showing the thin-film magnetic head in accordance with an embodiment of the present invention.
Figure 4:
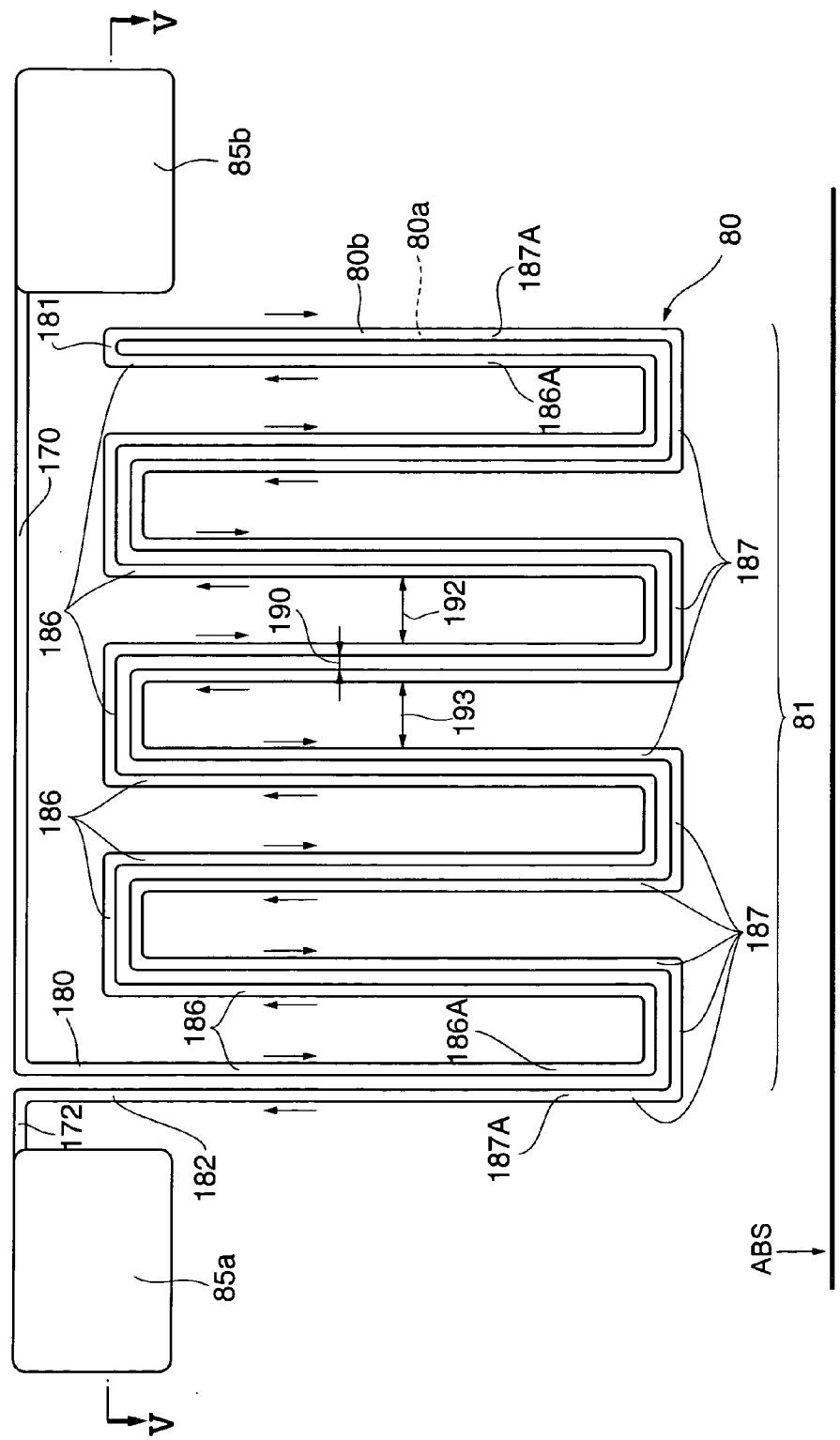
FIG. 4 is a plan view showing a heater of the thin-film magnetic head in accordance with the embodiment.
Figure 5:
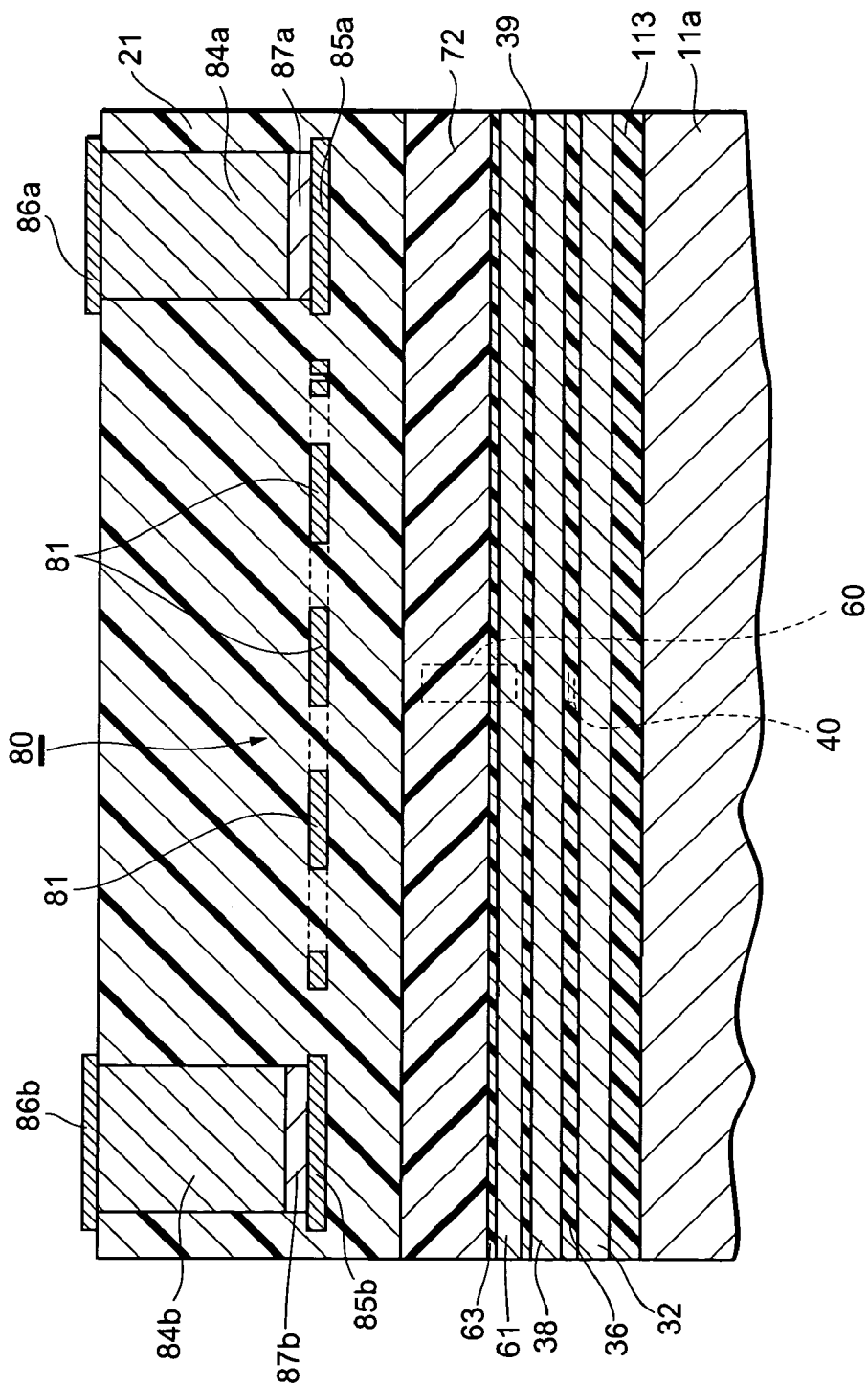
FIG. 5 is a sectional view of the thin-film magnetic head taken along the line V-V of FIG. 3.

FIG. 3 is a sectional view of the thin-film magnetic head 10 taken along a direction perpendicular to both the air bearing surface S and track lines. FIG. 4 is a plan view of a heater member in the thin-film magnetic head 10, in which the air bearing surface S is located on the lower side of the drawing. FIG. 5 is a sectional view of the thin-film magnetic head taken in parallel with the air bearing surface S of the thin-film magnetic head, and corresponds to the line V-V of FIGS. 3 and 4. The thin-film magnetic head 10 is a composite thin-film magnetic head, and is formed on the support 11a. As shown in FIG. 3, the thin-film magnetic head 10 mainly comprises a reproducing head part 30, a recording head part 60, and the overcoat layer 21 in succession from the support 11a side. The reproducing head part 30 includes a GMR (Giant MagnetoResistive) device 40 as a magnetoresistive device. The recording head part 60 is an inductive electromagnetic transducer. The overcoat layer 21 is disposed on the recording head part 60.

The support 11a is a wafer-like substrate made of AlTiC ($Al_2O_3.TiC$) or the like. On the support 11a, an undercoat layer 113 made of an insulating material such as alumina is formed by a thickness of 1 to 10 μm.

The reproducing head part 30 is disposed on the undercoat layer 113. The reproducing head part 30 is constituted by a lower shield layer 32, an insulating layer 36, and an upper shield layer 38 which are successively laminated from the undercoat layer 113 side. The GMR device 40 is included in the insulating layer 36 so as to be held from the upper and lower sides. The GMR device 40, which utilizes a giant magnetoresistive effect yielding a high magnetoresistance change ratio, has a multilayer structure (not depicted) and is exposed to the ABS side. Each of the lower shield layer 32 and upper shield layer 38 functions to prevent the GMR device 40 from sensing unnecessary external magnetic fields, and includes a magnetic material. The lower shield layer 32 has a thickness of about 1 to 3 μm, whereas the upper shield layer 38 has a thickness of about 1 to 4 μm. The insulating layer 36 has a thickness of about 0.05 to 1.0 μm.

When the specification uses words "upper" and "lower" as in the case of shield layers, "lower" refers to the side nearer to the support 11a, whereas "upper" refers to the side farther from the support 11a.

The recording head part 60, which is an inductive magnetoresistive device for longitudinal recording, is formed on the reproducing head part 30 by way of an insulating layer 39. The insulating layer 39 can employ alumina or the like having a thickness of about 0.1 to 2.0 µm, but is not always necessary. The recording head part 60 comprises a lower magnetic pole 61 made of a soft magnetic material, and a gap layer 63 made of a nonmagnetic insulating material in succession from the insulating layer 39 side. A magnetic pole part layer 64a is laminated on the gap layer 63 on the ABS side. On the gap layer 63, an insulating layer 72 including two stages, i.e., upper and lower stages, of a thin-film coil 70 is laminated on the side farther from the ABS. Disposed on the magnetic pole part layer 64a and the insulating layer 72 is a yoke part layer 64b which holds a part of the thin-film coil 70 between the yoke part layer 64b and the lower magnetic pole 61, and magnetically connects with the lower magnetic pole 61 on the side separated from the air bearing surface S. The lower magnetic pole 61, gap layer 63, thin-film coil 70, insulating layer 72, and upper magnetic pole 64 constitute the recording head part 60.

The lower magnetic pole 61 is formed from a magnetic material such as Permalloy (NiFe), for example, by a thickness of about 1 to 3 µm.

The gap layer 63 is formed from a nonmagnetic insulator such as alumina ($Al_2O_3$) or a combination of a nonmagnetic conductor and a nonmagnetic insulator, for example, by a thickness of about 0.05 to 0.5 µm.

The magnetic pole part layer 64a constructs the upper magnetic pole 64 together with the yoke part layer 64b, and can be formed not only from Permalloy (NiFe), but also from (1) a material containing iron and nitrogen atom; (2) a material containing iron, zirconia, and oxygen atom; (3) a material containing iron and nickel element; or the like. The thickness of the magnetic pole part layer 64a is 0.5 to 3.5 µm, for example, preferably 1.0 to 2.0 µm.

The yoke part layer 64b is made of the same material as with the magnetic pole part layer 64a, and has a thickness of about 1 to 5 µm, for example.

The thin-film coil 70 is made of a conductor such as Cu, whereas each stage has a thickness of about 1 to 3 µm, for example.

The insulating layer 72 is made of an insulator such as alumina or resist, and has a thickness of about 0.1 to 3 µm, for example.

When a recording current is caused to flow through the thin-film coil 70, a magnetic flux occurs between the magnetic pole part layer 64a and the lower magnetic pole 61, whereby information can be recorded in the recording medium 2 such as hard disk.

The overcoat layer 21 is a layer made of an insulating material such as alumina for protecting the recording head part 60 of the thin-film magnetic head 10. The overcoat layer 21 is provided on the recording head part 60 by a thickness of 5.0 to 30 µm. In the overcoat layer 21, a ridge defined by the ABS and the upper face located farthest from the support 11a is formed with a cutout 100.

As shown in FIGS. 3 to 5, a heater member 80 is disposed within the overcoat layer 21 in this embodiment. Within the overcoat layer 21, the heater member 80 is formed in parallel with the upper shield layer 38 and the like while being separated from the ABS S by a predetermined distance.

As shown in FIG. 4, the heater member 80 comprises a heating part 81 formed by a single line meandering within the layer, and extraction electrodes 85a, 85b. The extraction electrodes 85a, 85b are connected to both ends of the heating part 81, respectively. The heater member 80 forms a predetermined length of conducting path. More specifically, the heating part 81 comprises an upward part 186, a downward part 187, and connecting parts 170 and 172. The upward part 186 is formed so as to meander like a rectangular wave from a predetermined start point 180 to a turning point 181. The downward part 187 is formed so as to return from the turning point 181 to an end point 182 near the start point 180 while meandering along the upward part 186. The connecting part 170 electrically connects the start point 180 to the extraction electrode 85b. The connecting part 172 electrically connects the end point 182 to the extraction electrode 85a. A gap 190 between portions of the upward part 186 and downward part 187 formed along each other is made narrower than a gap 192 between opposing portions of the upward part 186 and a gap 193 between opposing portions of the downward part 187.

The thickness of the heating part 81 in the heater member 80 is about 100 to 500 nm, for example. The heating part 81 is made of a material containing NiCu. The Ni atom content in NiCu is 15 to 60 atom %, for example, preferably 25 to 45 atom %. When the material for the heating part 81 is NiCu, it may contain at least one of elements of Ta, Al, Mn, Cr, Fe, Mo, Co, Rh, Si, Ir, Pt, Ti, Nb, Zr, and Hf as an additive in addition to NiCu. The additive content is preferably 5 atom % or less.

The material for the heating part 81 may contain NiCr in place of NiCu. In this case, the Ni atom content in NiCr is 55 to 90 atom %, for example, preferably 70 to 85 atom %. When the material for the heating part 81 is NiCr, it may contain at least one of elements of Ta, Al, Mn, Cu, Fe, Mo, Co, Rh, Si, Ir, Pt, Ti, Nb, Zr, and Hf as an additive in addition to NiCr. The additive content is preferably 5 atom % or less.

The extraction electrodes 85a, 85b of the heater member 80 are made of the same material as with the heating part 81. As shown in FIGS. 3 and 5, conductive electrode film members 87a, 87b are formed on the extraction electrodes 85a, 85b, respectively. Upwardly extending bumps 84a, 84b are disposed on the conductive electrode film members 87a, 87b, respectively. The conductive electrode film members 87a, 87b and bumps 84a, 84b are formed by electroplating using the conductive electrode film members 87a, 87b as electrodes. The conductive electrode film members 87a, 87b and bumps 84a, 84b are made of a conductive material such as Cu. Each of the conductive electrode film members 87a, 87b has a thickness of about 10 to 200 nm, whereas each of the bumps 84a, 84b has a thickness of about 10 to 30 µm.

Upper ends of the bumps 84a, 84b are exposed from the overcoat layer 21, whereas heater pads 86a, 86b are attached to the exposed surfaces of the bumps 84a, 84b, respectively. A current is supplied to the heater member 80 by way of the heater pads 86a, 86b. Though not illustrated in FIGS. 3 and 5 for the sake of simplicity, the recording head part 60 is connected to the recording head pads 18a, 18b (see FIG. 2), and the magnetoresistive device 40 of the reproducing head part 30 is connected to the reproducing pads 19a, 19b.

Figure 6:
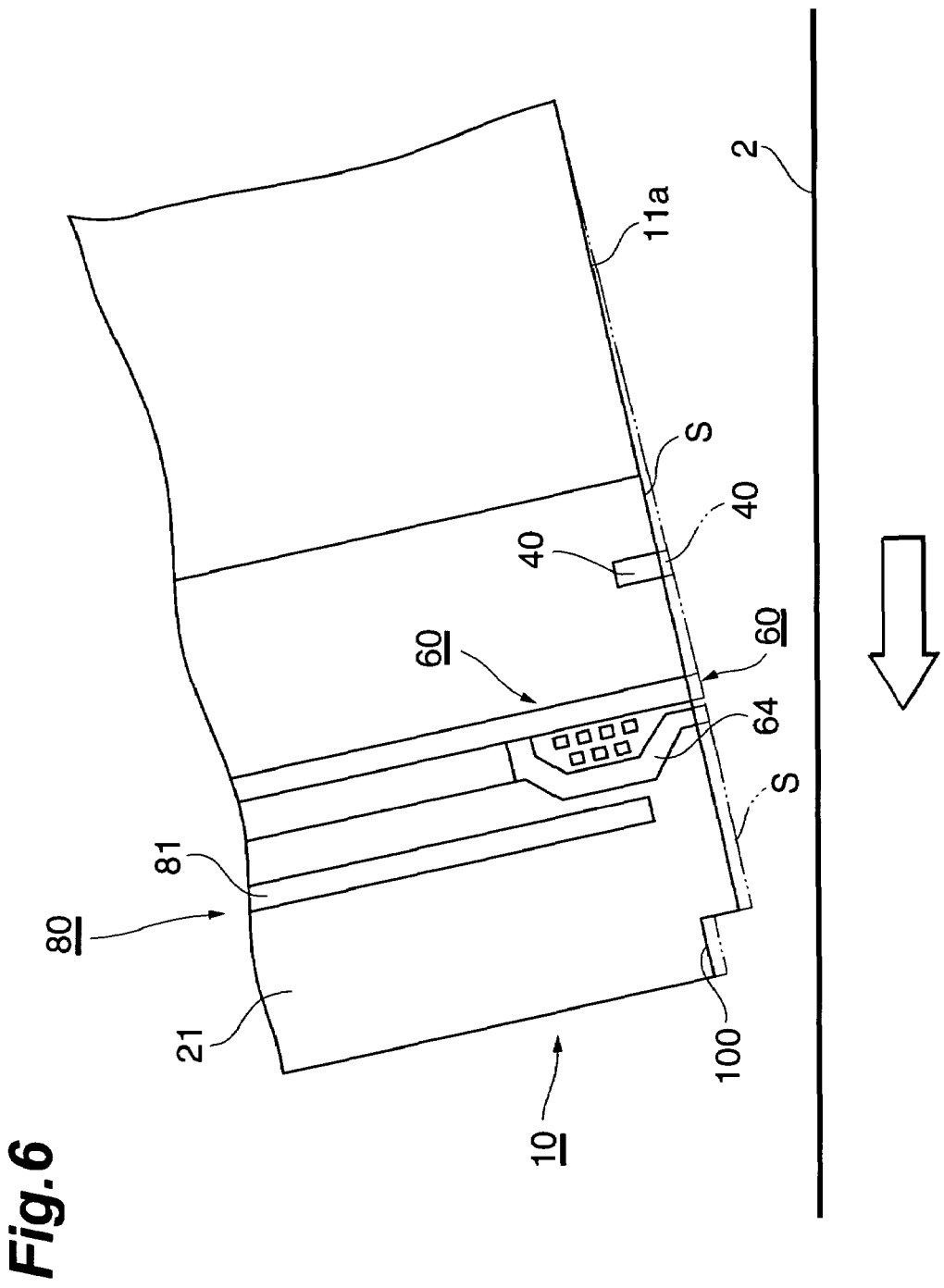
FIG. 6 is a schematic view showing a state where the thin-film magnetic head in accordance with the embodiment thermally expands.

Operations of thus configured thin-film magnetic head 10, head gimbal assembly 15, and hard disk drive 1 will now be explained. As shown in FIG. 6, when the hard disk 2 rotates in the direction of arrow depicted, the resulting airflow causes the thin-film magnetic head 10 to float up and attain such an inclined posture (bent-forward posture) that the upper magnetic pole 64 side of the recording head part 60 approaches the hard disk 2. When the heater member 80 is energized here, the heat generated from the heater member 80 thermally expands the thin-film magnetic head 10 about the heater member 80. The thermal expansion of the thin-film magnetic head 10 about the heater member 80 makes the ABS S of the thin-film magnetic head 10 and support 11a project toward the recording medium 2 as indicated by dash-double-dot lines. This reduces the distance between the GMR device 40 or recording head part 60 and the hard disk 2, thus making it possible to attain a higher reproducing output and carry out writing with a higher density, etc. Controlling the power supplied to the heater member 80 here can regulate the amount of projection, whereby the distance between the recording head part 60 or GMR device 40 and the recording medium 2 can be adjusted to a desirable value. The power supplied to the heater member 80 can be set to about 100 mW, for example.

Since the material for the heating part 81 in the heater member 80 contains NiCu or NiCr in this embodiment, the electric resistivity of the heater member 80 (heating part 81) is restrained from changing as the temperature of the heating part 81 in the heater member 80 rises when the heater member 80 is energized. This makes it relatively easy for the heater member 80 to keep a desirable heating state. As a result, the distance between the recording head part 60 or GMR device 40 and the recording medium 2 can be regulated so as to become a desirable value.

Since the heater member 80 is disposed within the overcoat layer 21, the structure becomes simpler than that in which a heater is disposed in a part lower than or on a level with the GMR device 40 or recording head part 60. As a result, the making of the thin-film magnetic head 10 becomes easier.

While the heater member 80 is disposed within the overcoat layer 21, the recording head part 60 is disposed between the overcoat layer 21 and the GMR device 40. Therefore, the gap between the GMR device 40 and the heater member 80 is greater than that between the recording head part 60 and the heater member 80. As a result, the GMR device 40, which is relatively susceptible to influences of heating, becomes less likely to be affected by a high temperature, whereby reliability can be improved.

Since the overcoat layer 21 of the thin-film magnetic head 10 is formed with the cutout 100, the ABS S of the thin-film magnetic head 10 is less likely to come into contact with the recording medium 2 even when projecting toward the hard disk 2 upon thermal expansion. The form of the cutout 100 is not limited to a single stage of inverted L as in this embodiment, but may be a multistage cutout, a cutout with a tilted surface, etc.

In the heater member 80, the upward part 186 and downward part 187 meander along each other as shown in FIG. 4. Therefore, as can be seen from Ampere's right-hand screw rule, respective magnetic fields generated from the upward part 186 and downward part 187 between the turning point 181 and the start point 180 and end point 182 cancel each other out. As a result, the leakage of magnetic fields is reduced, and becomes less likely to adversely affect the recording head part 60 and magnetoresistive device 40.

Also, the gap 190 is made narrower than the gap 193 or 192. Therefore, the portions of upward part 186 and downward part 187 disposed close to each other are less likely to be influenced by magnetic fields from the portions of upward part 186 and downward part 187 distanced from the former portions, whereby the magnetic fields generated upon energization favorably cancel each other out. As a result, the leakage of magnetic fields from portions 186A, 187A of upward and downward parts disposed along each other on the outermost side of the heater member 80 is reduced in particular.

As explained in the foregoing, this embodiment provides the thin-film magnetic head 10, head gimbal assembly 15, and hard disk drive 1, which can shorten the distance from the hard disk 2 and achieve a higher density.

Figure 7:
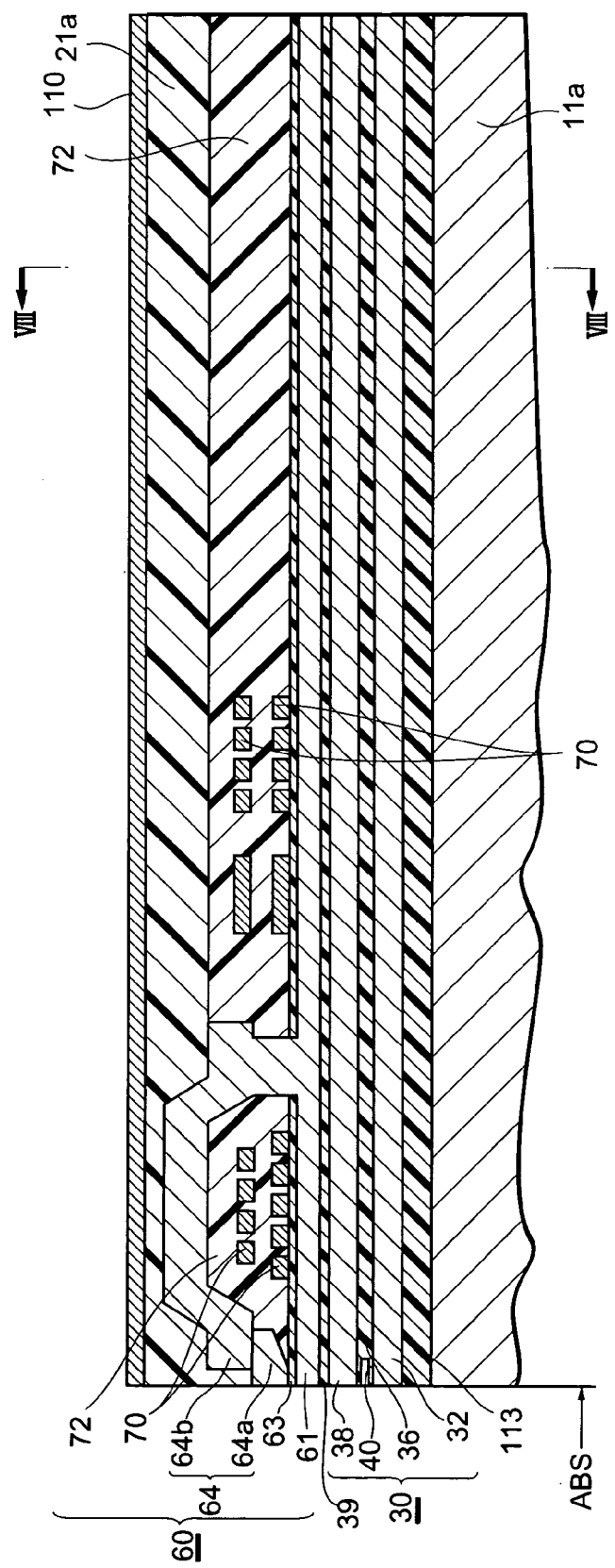
FIG. 7 is a view showing a method of making the thin-film magnetic head in accordance with the embodiment.
Figure 8:
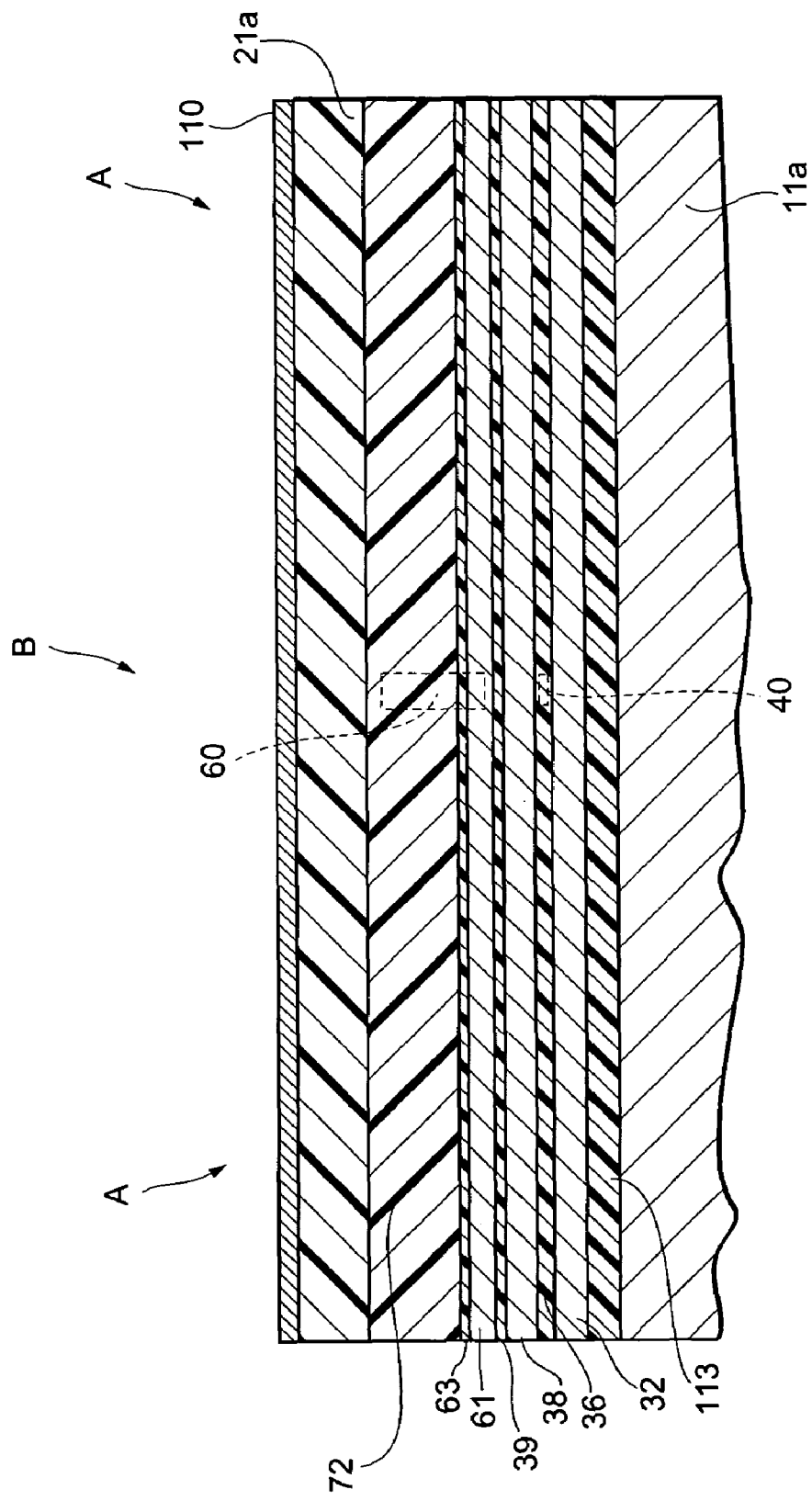
FIG. 8 is a sectional view of the thin-film magnetic head taken along the line VIII-VIII of FIG. 7.

An example of the method of making the thin-film magnetic head in accordance with this embodiment will now be explained with reference to FIGS. 7 to 11. FIG. 7 is a sectional view of the thin-film magnetic head taken along a direction perpendicular to both the air bearing surface S and track lines. FIG. 8 is a sectional view of the thin-film magnetic head taken in parallel with the air bearing surface S in the state of FIG. 7, corresponding to the line VIII-VIII of FIG. 7. Known manufacturing steps will be explained in brief.

First, as shown in FIGS. 7 and 8, an undercoat layer 113 made of an insulating material such as alumina ($Al_2O_3$), for example, is formed by sputtering on a support 11a which is a substrate made of AlTiC ($Al_2O_3$.TiC) or the like.

Next, a lower shield layer 32 made of a magnetic material such as Permalloy is formed on the undercoat layer 113 by plating. Further, a GMR device 40 and an insulating layer 36 holding it horizontally and vertically are formed on the undercoat layer 113 by a known technique. The GMR device 40 is constituted by a plurality of films in practice, but is depicted as a single layer. The GMR device 40 is formed on the ABS side. Subsequently, an upper shield layer 38 is formed on the insulating layer 36 by plating, for example. A reproducing head part 30 is obtained by the foregoing.

Then, an insulating layer 39 made of an insulating material such as $Al_2O_3$ is formed on the upper shield layer 38 by sputtering, for example.

Next, a lower magnetic pole 61 made of Permalloy is formed on the insulating layer 39 by sputtering, for example. Subsequently, a gap layer 63 made of a nonmagnetic insulator or a combination of a nonmagnetic conductor and a nonmagnetic insulator is formed on the lower magnetic pole 61 by sputtering, for example. Further, an insulating layer 72 having two stages of thin-film coil 70, a magnetic pole part layer 64a of an upper magnetic pole 64, and a yoke part layer 64b of the upper magnetic pole 64 are formed on the gap layer 63 by a known method using photolithography, dry etching, or the like. Here, they are formed such that a part of the thin-film coil 70 is held between the lower magnetic pole 61 and the upper magnetic pole 64. Though two stages of the thin-film coil 70 are formed in this embodiment, the number of stages is not limited thereto. A helical coil or the like may be formed as well. This completes the recording head part 60.

Next, a nonmagnetic overcoat lower layer 21a is formed so as to cover the recording head part 60. Then, a heater material layer 110 made of a conductive material is formed on the overcoat lower layer 21a by sputtering or the like. Preferably, the conductive material for the heater material layer 110 contains NiCu or NiCr. When NiCu is used as the conductive material for the heater material layer 110, the material may contain any element of Ta, Al, Mn, Cr, Fe, Mo, Co, Rh, Si, Ir, Pt, Ti, Nb, Zr, and Hf as an additive in addition to NiCu. When NiCr is used as the conductive material for the heater material layer 110, the material may contain any element of Ta, Al, Mn, Cu, Fe, Mo, Co, Rh, Si, Ir, Pt, Ti, Nb, Zr, and Hf as an additive in addition to NiCr.

Figure 9:
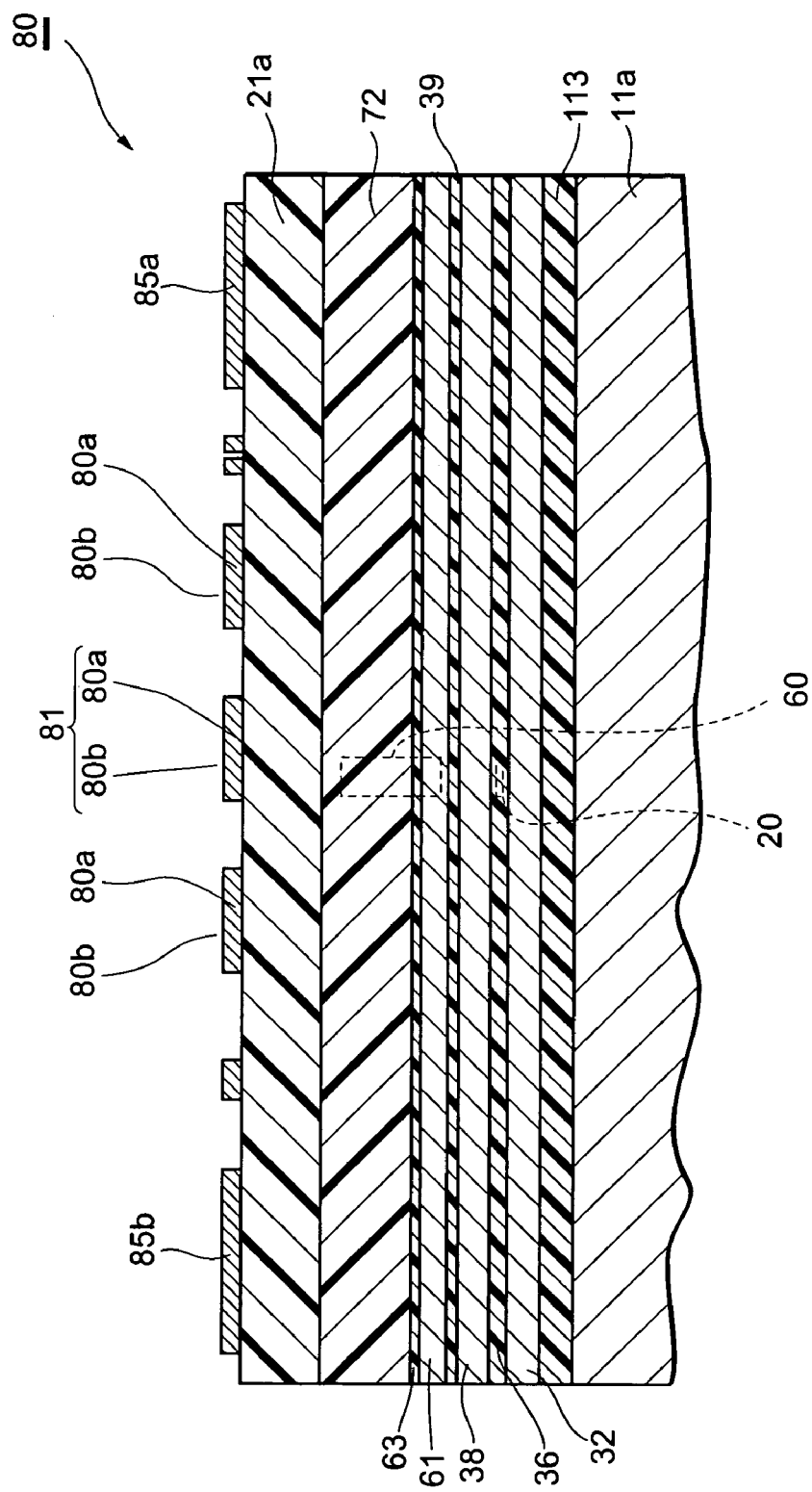
FIG. 9 is a view, subsequent to FIG. 8, showing the method of making the thin-film magnetic head in accordance with the embodiment.

Next, the exposed part of the heater material layer 110 is partly eliminated by ion milling or the like until the upper face of the overcoat lower layer 21a is exposed, so as to form extraction electrodes 85a, 85b and a meandering heating part 81 as shown in FIG. 9. This forms a heater member 80.

Figure 10:
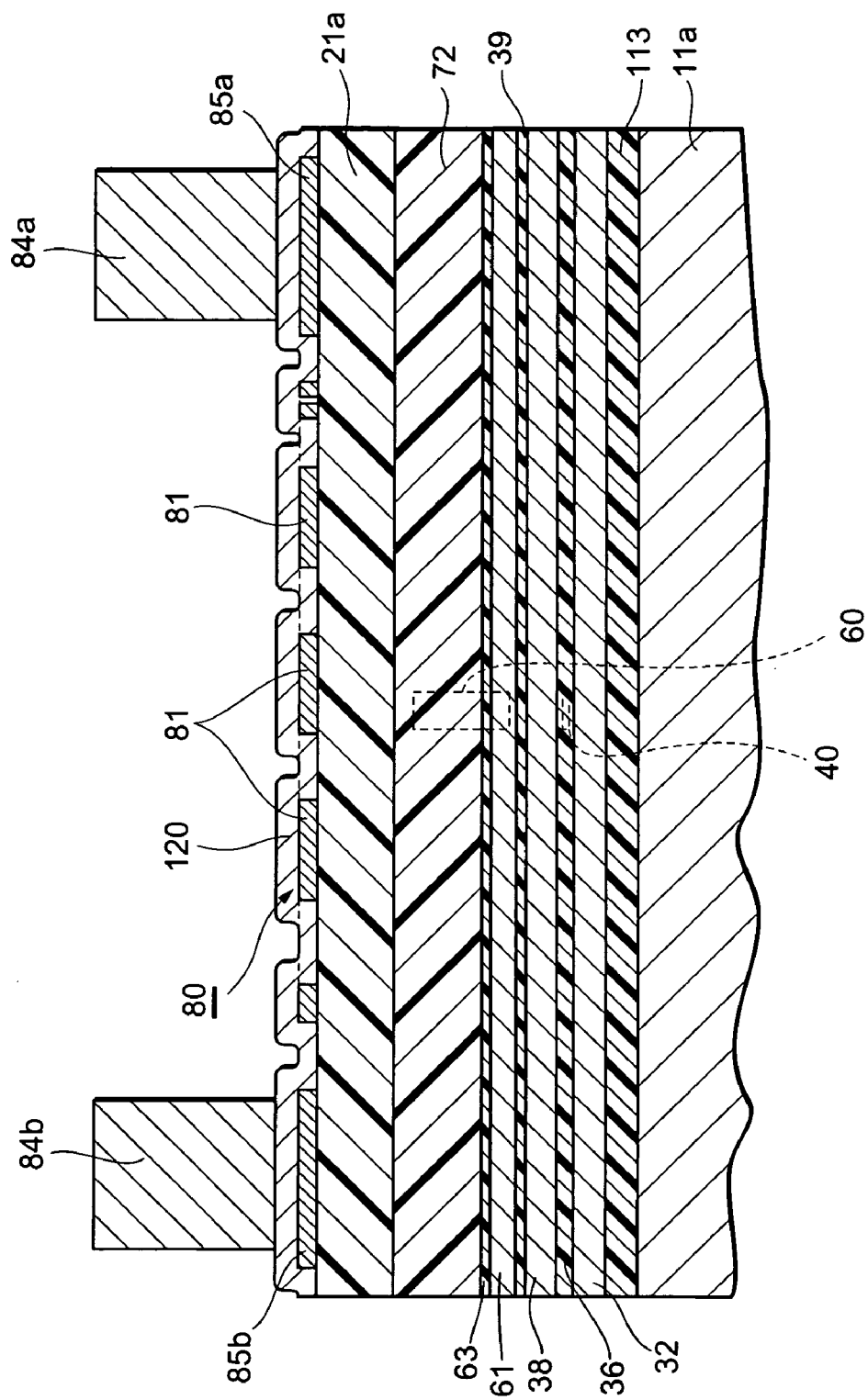
FIG. 10 is a view, subsequent to FIG. 9, showing the method of making the thin-film magnetic head in accordance with the embodiment.

Next, as shown in FIG. 10, a plating electrode film 120 made of a conductive material such as Cu is formed with a predetermined thickness, e.g., 10 to 200 nm, by sputtering or the like in portions of the heating part 81 of the heater member 80, the extraction electrodes 85a, 85b of the heater member 80, and the overcoat lower layer 21a where they are exposed to the surface.

Subsequently, by plating using the electrode film 120 as an electrode, upwardly extending bumps 84a, 84b are formed on respective parts of the electrode film 120 in contact with the extraction electrodes 85a, 85b.

Figure 11:
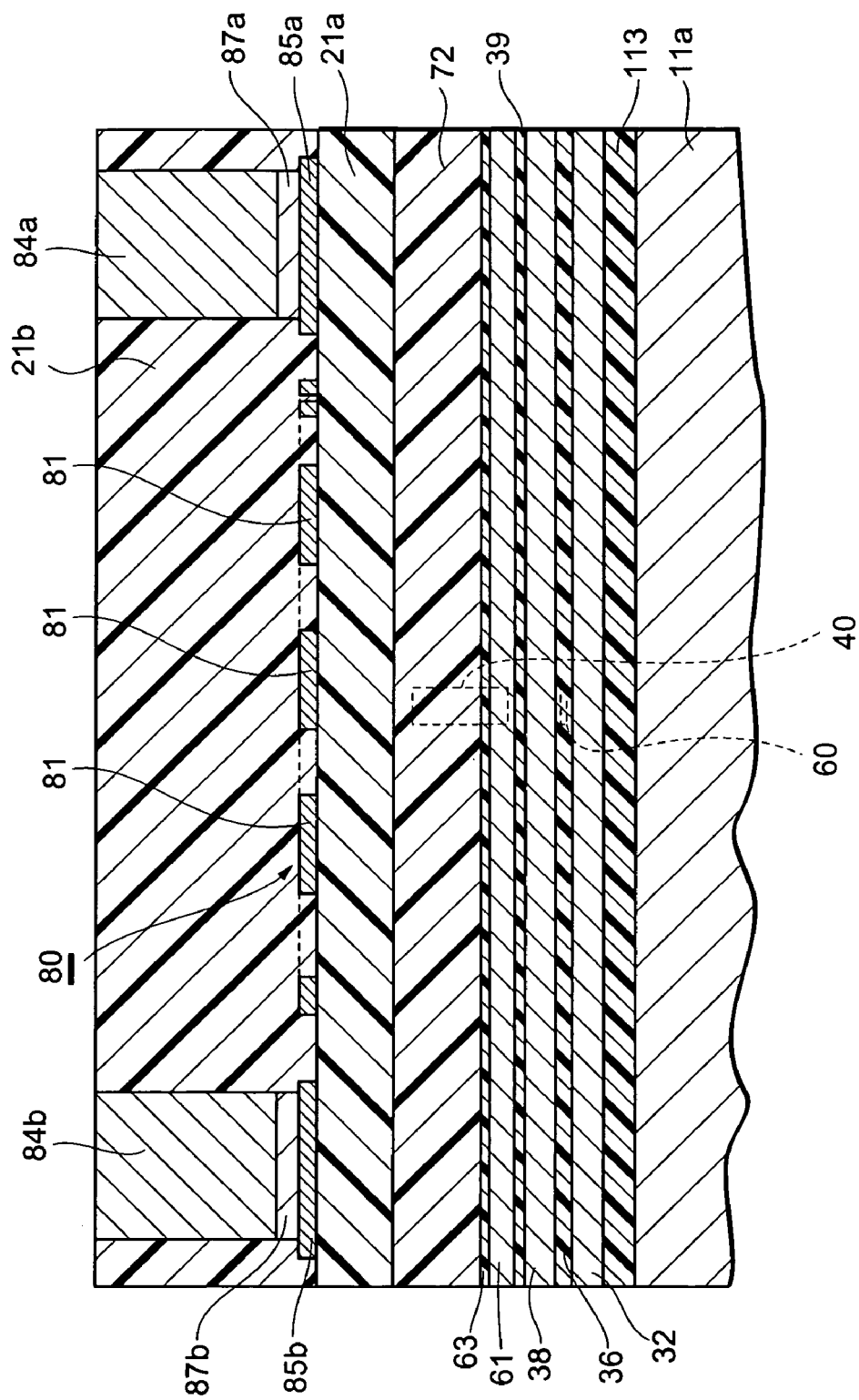
FIG. 11 is a view, subsequent to FIG. 10, showing the method of making the thin-film magnetic head in accordance with the embodiment.

Next, as shown in FIG. 11, the part of electrode film 120 exposed to the surface is eliminated by milling or the like using the bumps 84a, 84b as masks. Here, the parts of electrode film 120 located under the bumps 84a, 84b remain as electrode film parts 87a, 87b without being removed.

Subsequently, an insulating material such as $Al_2O_3$ is laminated as an upper layer by sputtering or the like, and then is shaven by polishing, for example, by a desirable height such that the bumps 84a, 84b are exposed to the upper face, so as to yield an overcoat upper layer 21b. Thereafter, heater pads 86a, 86b are disposed at exposed parts of upper ends of the bumps 84a, 84b. Here, the overcoat lower layer 21a and the overcoat upper layer 21b correspond to the overcoat layer 21. Though not illustrated, recording and reproducing pads are also formed here. Further, though not shown, a ridge of the overcoat layer 21 is shaven, so as to form a cutout 100.

The foregoing completes the thin-film magnetic head 10 shown in FIGS. 3 to 5 in accordance with this embodiment.

Subsequently, the support 11a is formed with a slider rail by ion milling or the like, whereby the head slider 11 shown in FIG. 2 is obtained. This head slider 11 is mounted to a gimbal 12, which is then connected to a suspension arm 13, whereby the head gimbal assembly 15 shown in FIG. 1 is completed. After being produced, the head gimbal assembly 15 is assembled such that the head slider 11 is movable over the hard disk 2, and that magnetic signals can be recorded and reproduced, whereby the hard disk drive 1 shown in FIG. 1 is completed.

The fact that this embodiment can restrain the electric resistivity of the heater member 80 from changing as its temperature rises will now be explained specifically with reference to Examples and Comparative Examples. The following Examples and Comparative Examples took account of the heating part 81 in the heater member 80 and determined how much the change in electric resistivity of the heating part 81 was suppressed. In each of Examples and Comparative Examples, the pattern, thickness, and the like of the heating part 81 were set such as to yield an electric resistivity (coil resistance) of 100 Ω in a non-energized state.

Comparative Examples 1 to 8 were cases where respective materials of their heating parts 81 were $Ni_{80}Fe_{20}$ (composition made of 80 atom % of Ni and 20 atom % of Fe), Cu, W, Ta, Cr, Al, Co, and $Co_{90}Fe_{10}$ (composition made of 90 atom % of Ni and 10 atom % of Fe). Their respective coil resistances [Ω] when a power of 0.1 mW was supplied thereto were 99.2, 100.3, 101.1, 101.8, 100.6, 100.5, 100.7, and 99.1. Their respective coil resistances [Ω] when a power of 100 mW was supplied thereto were 124.7, 132.3, 137.0, 129.2, 120.3, 130.9, 149.9, and 132.5. Therefore, their respective resistance change ratios (%) were 25.7. 31.9, 35.5, 36.9, 19.6, 30.2, 48.9, and 33.7.

Examples 1 to 7 were cases where respective materials of their heating parts 81 were $Ni_{60}Cu_{40}$ (composition made of 60 atom % of Ni and 40 atom % of Cu), $Ni_{55}Cu_{45}$ (composition made of 55 atom % of Ni and 45 atom % of Cu), $Ni_{50}Cu_{50}$ (composition made of 50 atom % of Ni and 50 atom % of Cu), $Ni_{45}Cu_{55}$ (composition made of 45 atom % of Ni and 55 atom % of Cu), $Ni_{40}Cu_{60}$ (composition made of 40 atom % of Ni and 60 atom % of Cu), $Ni_{25}Cu_{75}$ (composition made of 25 atom % of Ni and 75 atom % of Cu), and $Ni_{15}Cu_{85}$ (composition made of 15 atom % of Ni and 85 atom % of Cu). Their respective coil resistances [Ω] when a power of 0.1 mW was supplied thereto were 100.2, 101.8, 101.8, 101.0, 99.0, 101.1, and 102.0. Their respective coil resistances [Ω]when a power of 100 mW was supplied thereto were 97.3, 99.9, 101.0, 101.2, 99.8, 103.0, and 104.9. Therefore, their respective resistance change ratios (%) were −2.9, −1.9, −0.8, 0.2, 0.8, 1.9, and 2.8.

Examples 8 to 12 were cases where respective materials of their heating parts 81 were $Ni_{90}Cr_{10}$ (composition made of 90 atom % of Ni and 10 atom % of Cr), $Ni_{85}Cu_{15}$ (composition made of 85 atom % of Ni and 15 atom % of Cr), $Ni_{80}Cr_{20}$ (composition made of 80 atom % of Ni and 20 atom % of Cr), $Ni_{70}Cr_{30}$ (composition made of 70 atom % of Ni and 30 atom % of Cr), and $Ni_{55}Cr_{45}$ (composition made of 55 atom % of Ni and 45 atom % of Cr). Their respective coil resistances [Ω]when a power of 0.1 mW was supplied thereto were 99.4, 102.6, 101.8, 100.4, and 99.7. Their respective coil resistances [Ω] when a power of 100 mW was supplied thereto were 102.2, 104.4, 102.2, 102.2, and 102.6. Therefore, their respective resistance change ratios (%) were 2.8, 1.8, 0.4, 1.8, and 2.9.

FIG. 12 shows the foregoing results. The electric resistance of the heating part 81 is seen to be restrained from changing at the time of energization when the material for the heating part 81 is NiCu or NiCr as such. It is also seen that, in the case where the material for the heating part 81 is NiCu, the change in electric resistivity of the heater member 80 (heating part 81) is further suppressed when the Ni atom content is 25 to 45 atom %. On the other hand, it is seen that, in the case where the material for the heating part 81 is NiCr, the change in electric resistivity of the heater member 80 (heating part 81) is further suppressed when the Ni atom content is 70 to 85 atom %. At a power of 0.1 mW, the temperature (coil temperature) of the heating part 81 is substantially at room temperature. At a power of 100 mW, the temperature (coil temperature) of the heating part 81 is about 80° C.

The following Examples specifically show that the change in electric resistivity of the heater member 80 due to a temperature rise in the heater member 80 can also be suppressed when the material for the heating part 81 is an alloy in which any element of Ta, Al, Mn, Cr, Fe, Mo, Co, Rh, Si, Ir, Pt, Ti, Nb, Zr, and Hf is added to NiCu.

Examples 13 to 27 were cases where respective materials of their heating parts 81 were an NiCuTa alloy in which 2 atom % of Ta was added to $Ni_{45}Cu_{55}$, an NiCuAl alloy in which 5 atom % of Al was added to $Ni_{45}Cu_{55}$, an NiCuMn alloy in which 2 atom % of Mn was added to $Ni_{45}Cu_{55}$, an NiCuCr alloy in which 5 atom % of Cr was added to $Ni_{45}Cu_{55}$, an NiCuFe alloy in which 1 atom % of Fe was added to $Ni_{45}Cu_{55}$, an NiCuMo alloy in which 3 atom % of Mo was added to $Ni_{45}Cu_{55}$, an NiCuCo alloy in which 3 atom % of Co was added to $Ni_{45}Cu_{55}$, an NiCuRh alloy in which 1 atom % of Rh was added to $Ni_{45}Cu_{55}$, an NiCuSi alloy in which 2 atom % of Si was added to $Ni_{45}Cu_{55}$, an NiCuIr alloy in which 1 atom % of Ir was added to $Ni_{45}Cu_{55}$, an NiCuPt alloy in which 1 atom % of Pt was added to $Ni_{45}Cu_{55}$, an NiCuTi alloy in which 2 atom % of Ti was added to $Ni_{45}Cu_{55}$, an NiCuNb alloy in which 1 atom % of Nb was added to $Ni_{45}Cu_{55}$, an NiCuZr alloy in which 1 atom % of Zr was added to $Ni_{45}Cu_{55}$, and an NiCuHf alloy in which 1 atom % of Hf was added to $Ni_{45}Cu_{55}$. Their respective coil resistances [Ω] when a power of 0.1 mW was supplied thereto were 99.8, 100.1, 99.2, 99.8, 100.7, 102.7, 101.6, 104.3, 102.3, 101.2, 99.6, 100.3, 102.8, 102.9, and 100.5. Their respective coil resistances [Ω] when a power of 100 mW was supplied thereto were 101.0, 101.1, 100.5, 101.7, 101.9, 104.7, 103.2, 106.1, 103.4, 102.5, 100.9, 101.7, 104.7, 104.9, and 101.9. Therefore, their respective resistance change ratios (%) were 1.2, 1.0, 1.3, 1.9, 1.2, 1.9, 1.6, 1.7, 1.1, 1.3, 1.3, 1.4, 1.8, 1.9, and 1.4.

FIG. 13 shows the foregoing results. The electric resistivity of the heating part 81 is seen to be effectively restrained from changing upon energization in cases where the material for the heating part 81 is an alloy in which any element of Ta, Al, Mn, Cr, Fe, Mo, Co, Rh, Si, Ir, Pt, Ti, Nb, Zr, and Hf is added to NiCu as such.

The following Examples specifically show that the change in electric resistivity of the heater member 80 due to a temperature rise in the heater member 80 can also be suppressed when the material for the heating part 81 is an alloy in which any element of Ta, Al, Mn, Cu, Fe, Mo, Co, Rh, Si, Ir, Pt, Ti, Nb, Zr, and Hf is added to NiCr.

Examples 28 to 42 were cases where respective materials of their heating parts 81 were an NiCrTa alloy in which 2 atom % of Ta was added to $Ni_{80}Cr_{20}$, an NiCrAl alloy in which 5 atom % of Al was added to $Ni_{80}Cr_{20}$, an NiCrMn alloy in which 2 atom % of Mn was added to $Ni_{80}Cr_{20}$, an NiCrCu alloy in which 5 atom % of Cu was added to $Ni_{80}Cr_{20}$, an NiCrFe alloy in which 1 atom % of Fe was added to $Ni_{80}Cr_{20}$, an NiCrMo alloy in which 3 atom % of Mo was added to $Ni_{80}Cr_{20}$, an NiCrCo alloy in which 3 atom % of Co was added to $Ni_{80}Cr_{20}$, an NiCrRh alloy in which 1 atom % of Rh was added to $Ni_{80}Cr_{20}$, an NiCrSi alloy in which 2 atom % of Si was added to $Ni_{80}Cr_{20}$, an NiCrIr alloy in which 1 atom % of Ir was added to $Ni_{80}Cr_{20}$, an NiCrPt alloy in which 1 atom % of Pt was added to $Ni_{80}Cr_{20}$, an NiCrTi alloy in which 2 atom % of Ti was added to $Ni_{80}Cr_{20}$, an NiCrNb alloy in which 1 atom % of Nb was added to $Ni_{80}Cr_{20}$, an NiCrZr alloy in which 1 atom % of Zr was added to $Ni_{80}Cr_{20}$, and an NiCrHf alloy in which 1 atom % of Hf was added to $Ni_{80}Cr_{20}$. Their respective coil resistances [Ω] when a power of 0.1 mW was supplied thereto were 98.9, 100.9, 98.4, 100.1, 101.4, 103.5, 102.0, 105.1, 102.2, 102.2, 99.0, 99.9, 103.5, 102.1, and 101.3. Their respective coil resistances [Ω] when a power of 100 mW was supplied thereto were 100.4, 101.4, 99.5, 102.0, 103.1, 105.3, 103.9, 107.1, 103.0, 104.1, 100.9, 101.2, 105.1, 103.5, and 103.2. Therefore, their respective resistance change ratios (%) were 1.5, 0.5, 1.1, 1.9, 1.7, 1.7, 1.9, 1.9, 0.8, 1.9, 1.9, 1.3, 1.5, 1.4, and 1.9.

FIG. 14 shows the foregoing results. The electric resistivity of the heating part 81 is seen to be effectively restrained from changing upon energization in cases where the material for the heating part 81 is an alloy in which any element of Ta, Al, Mn, Cu, Fe, Mo, Co, Rh, Si, Ir, Pt, Ti, Nb, Zr, and Hf is added to NiCr as such.

Though the invention achieved by the inventors is explained with reference to an embodiment in the foregoing, the present invention is not restricted to the embodiment. For example, though the thin-film magnetic head 10 comprises both the GMR device 40 and recording head part 60 in the embodiment, the thin-film magnetic head may be provided with one of them alone.

Without being restricted to the embodiment, the heater member 80 may be disposed anywhere such as the undercoat layer 113 and insulating layer 72, for example. Two or more heater members 80 may be provided as well. The distance from the ABS S to the heater member 80 is not limited, either. Further, the form of the conducting path of the heater member 80 is not restricted.

Depending on the amount of current flowing through the heater member 80, etc., the heater member 80 may be covered with a shield layer. This can prevent the recording head part 60 and reproducing head part 30 from being adversely affected even when a magnetic field leaks from the heater member 80.

The reproducing head part 30 may employ an MR device other than the GMR device 40, such as an AMR (Anisotropy Magneto Resistive) device utilizing an anisotropic magnetoresistive effect, a TMR (Tunneling Magneto Resistive) device utilizing a magnetoresistive effect occurring at a tunnel junction, or a CPP (Current Perpendicular to Plane)-GMR device. Also, the thin-film magnetic head may employ the perpendicular recording scheme instead of the in-plane recording scheme.

Though the thin-film magnetic head 10 including the recording head part 60 and GMR device 40 is disposed at the end portion on one side of the track width direction orthogonal to track lines in the leading end part of the slider 11 in FIG. 2, it may be disposed at the end portion on the other side or in the center portion of the track width direction. It will be sufficient if the thin-film magnetic head 10 is disposed at a position facing the ABS S in the slider 11.

Though the heater pads 86a, 86b are disposed so as to be held between the recording pads 18a, 18b and the reproducing pads 19a, 19b in FIG. 2, any arrangement is possible without being restricted thereto.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A thin-film magnetic head comprising:
   at least one of an electromagnetic transducer and a magnetoresistive device; and
   a heater member adapted to generate heat upon energization;
   wherein the heater member contains NiCu.

2. A thin-film magnetic head according to claim 1, wherein NiCu has an Ni atom content of 25 to 45 atom %.

3. A thin-film magnetic head according to claim 1, wherein the heat member contains at least one of elements of Ta, Al, Mn, Cr, Fe, Mo, Co, Rh, Si, Ir, Pt, Ti, Nb, Zr, and Hf as an additive in addition to NiCu, the additive content to NiCu is preferably 5 atom % or less.

4. A thin-film magnetic head comprising:
   at least one of an electromagnetic transducer and a magnetoresistive device; and
   a heater member adapted to generate heat upon energization;
   wherein the heater member contains NiCr that NiCr has an Ni atom content of 70 to 85 atom %.

5. A thin-film magnetic head according to claim 4, wherein the heat member contains at least one of elements of Ta, Al, Mn, Cr, Fe, Mo, Co, Rh, Si, Ir, Pt, Ti, Nb, Zr, and Hf as an additive in addition to NiCr, the additive content to NiCr is preferably 5 atom % or less.

6. A head gimbal assembly comprising a support, a thin-film magnetic head formed on the support, and a gimbal for securing the support;

wherein the thin-film magnetic head comprises:

at least one of an electromagnetic transducer and a magnetoresistive device; and a heater member adapted to generate heat upon energization;

wherein the heater member contains NiCu or NiCr having an Ni atom content of 70 to 85 atom %.

7. A hard disk drive comprising a support, a thin-film magnetic head formed on the support, and a recording medium opposing the thin-film magnetic head;

wherein the thin-film magnetic head comprises:

at least one of an electromagnetic transducer and a magnetoresistive device; and a heater member adapted to generate heat upon energization;

wherein the heater member contains NiCu or NiCr having an Ni atom content of 70 to 85 atom %.

* * * * *